(12) United States Patent
Basey

(10) Patent No.: US 6,994,439 B2
(45) Date of Patent: Feb. 7, 2006

(54) NOISE DAMPENER

(75) Inventor: Gary Dennis Basey, Santa Rosa, CA (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 10/859,873

(22) Filed: Jun. 2, 2004

(65) Prior Publication Data
US 2004/0239898 A1 Dec. 2, 2004

Related U.S. Application Data

(60) Provisional application No. 60/475,237, filed on Jun. 2, 2003.

(51) Int. Cl.
G03B 21/14 (2006.01)
G02B 5/22 (2006.01)
G02B 7/00 (2006.01)
B23P 11/00 (2006.01)

(52) U.S. Cl. .................... 353/119; 353/84; 359/891; 359/892; 29/525.11; 29/525.12

(58) Field of Classification Search ............ 353/119, 353/31, 30–34, 84, 889–892, 59, 60, 121; 362/35, 368–371, 390; 279/32, 35, 37, 43.4, 279/43.6, 43.7, 43.8, 43.9, 81, 151
See application file for complete search history.

(56) References Cited

U.S. PATENT DOCUMENTS

| 795,470 | A | * | 7/1905 | Anger ...................... 362/281 |
| 4,739,396 | A | | 4/1988 | Hyatt |
| 5,044,598 | A | * | 9/1991 | Mann et al. ................ 248/638 |
| 5,798,887 | A | * | 8/1998 | Yoshida et al. ........... 360/99.08 |
| 5,860,726 | A | * | 1/1999 | Richardson ................. 362/35 |
| 6,474,818 | B1 | * | 11/2002 | Engle ........................ 353/84 |
| 6,585,488 | B1 | * | 7/2003 | Bucher et al. .......... 416/210 R |
| 6,637,895 | B2 | | 10/2003 | Fujimori et al. |
| 6,755,554 | B2 | * | 6/2004 | Ohmae et al. ............. 362/293 |
| 2004/0036967 | A1 | * | 2/2004 | Haggerty et al. .......... 359/443 |
| 2004/0045397 | A1 | * | 3/2004 | Chang ..................... 74/573 R |
| 2004/0145707 | A1 | * | 7/2004 | Lee ............................ 353/84 |

* cited by examiner

Primary Examiner—W. B. Perkey
Assistant Examiner—Andrew Sever
(74) Attorney, Agent, or Firm—Alleman Hall McCoy Russell & Tuttle LLP

(57) ABSTRACT

A device for dampening noise in a projection device is provided. The device includes a bracket configured to secure a color wheel assembly to an optical engine and an integrated noise reduction mechanism integrated into the bracket.

24 Claims, 4 Drawing Sheets

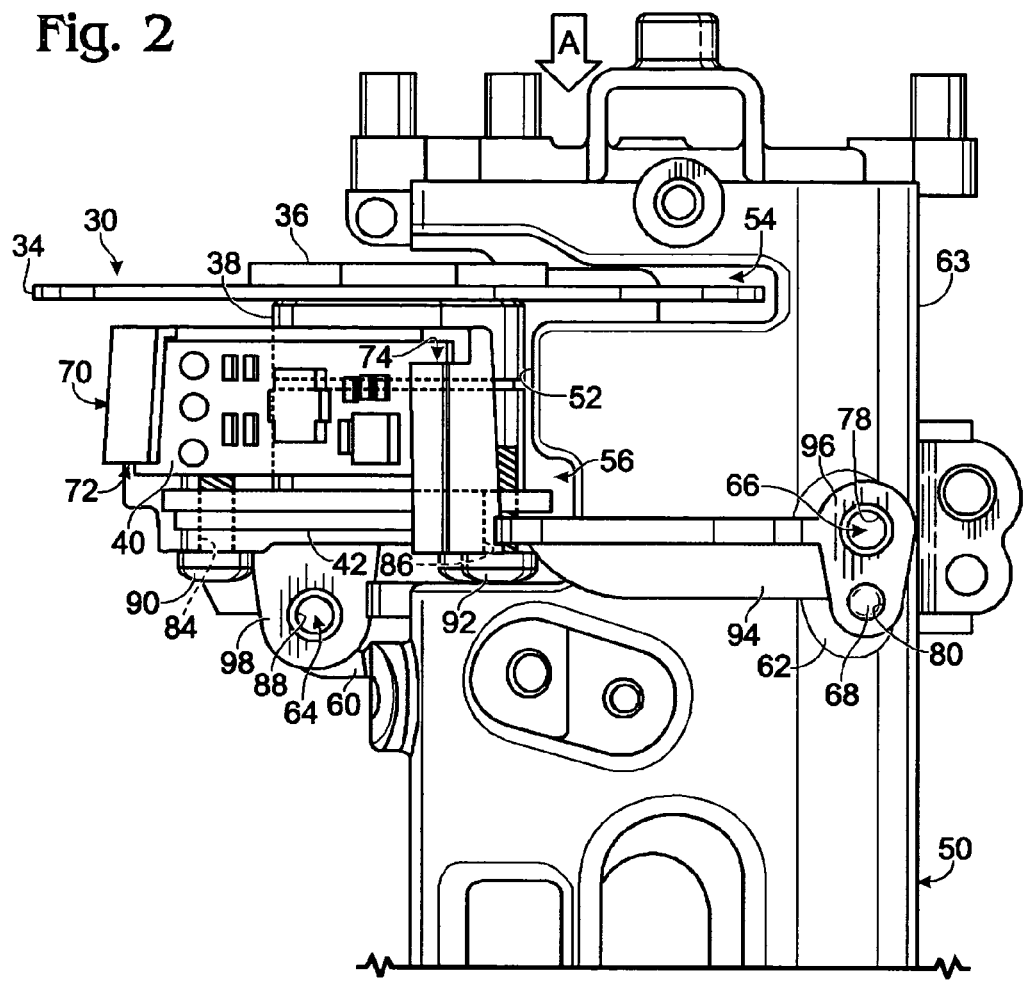
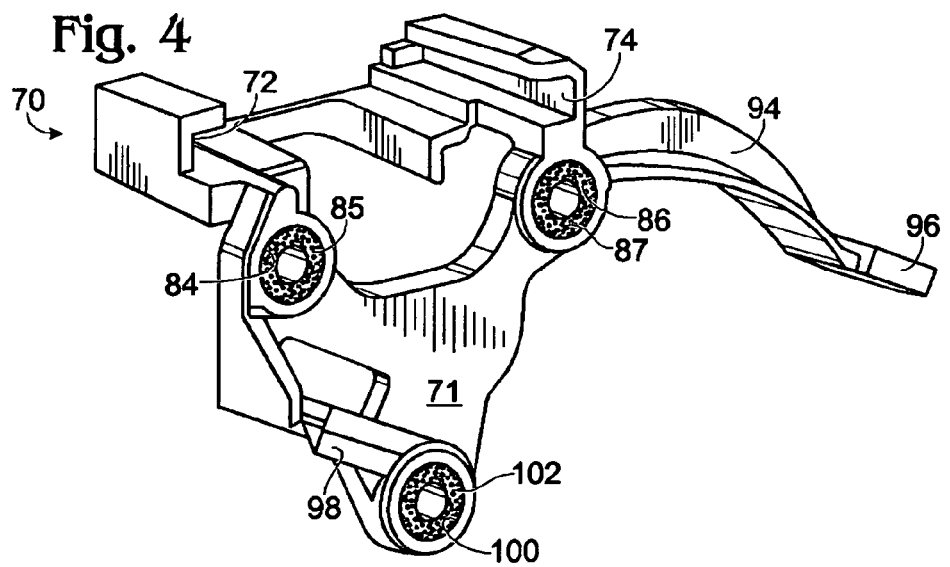

NOISE DAMPENER

CROSS-REFERENCE TO RELATED APPLICATIONS

The present application claims priority under 35 U.S.C. §119 to U.S. Provisional Patent Application Ser. No. 60/475,237, which was filed on Jun. 2, 2003. The disclosure of that application is hereby incorporated by reference in its entirety for all purposes.

TECHNICAL FIELD

The present invention relates generally to dampening devices, and more specifically, to noise dampening devices that may be utilized in a projection device.

BRIEF DESCRIPTION OF THE DRAWINGS

The disclosure is illustrated by way of example and not by way of limitation in the figures of the accompanying drawings, in which the like references indicate similar elements and in which:

FIG. 2 is a plan view of a projection device color wheel assembly mounted to an optical engine housing according to an embodiment of the present disclosure.

FIG. 4 is a perspective view of a bracket configured to mount the color wheel assembly to the optical engine as shown in FIG. 3 according to an embodiment of the present disclosure.

DETAILED DESCRIPTION

Figure 1:
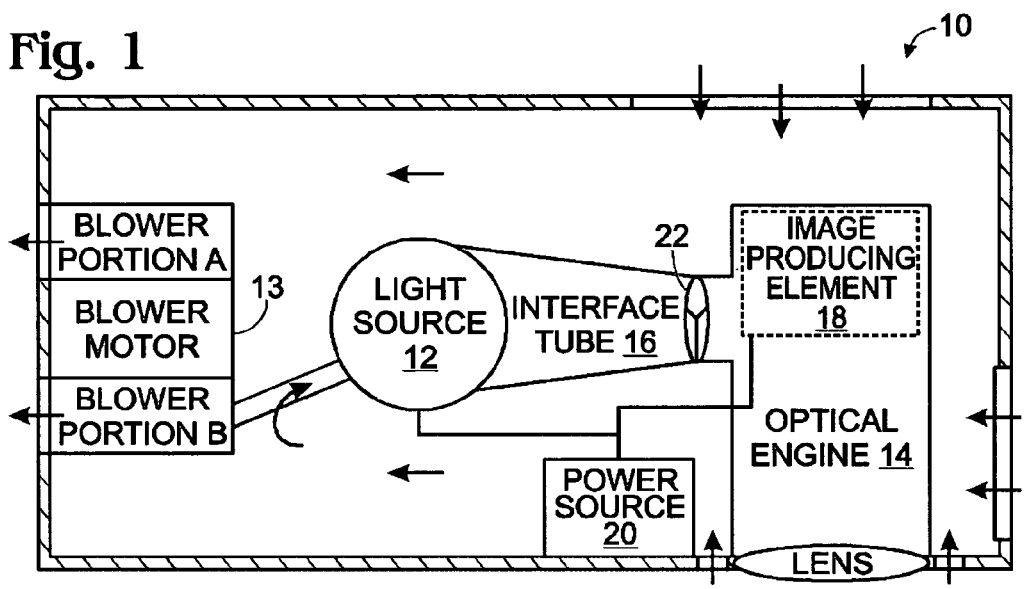
FIG. 1 is a schematic illustration of an exemplary projection device according to an embodiment of the present disclosure.

An exemplary projection device 10 is illustrated schematically in FIG. 1. Although described below in relation to a projection device, it should be appreciated that the present disclosure and the disclosed noise dampener may be used in any suitable device having a bracket securing a moving component such as a moving color wheel, motor, vibrator, etc. Thus, it should be understood that the projection device, described herein, is intended for illustrative purposes and other devices may be used and are incorporated within this disclosure.

Projection device 10 may be adapted to project an image on a display surface, including, but not limited to, a screen, a wall, or other suitable viewing surface or area. In some embodiments, projection device 10 may be an image display device or image-generating device that is configured to project an image onto a display surface. As used herein, a projection device may include any suitable display device or image projector, including, but not limited to, a digital projector, a liquid crystal display (LCD) projector, a digital light processing projector, etc. Moreover, projection device 10 may be configured as a front projection device or a rear projection device.

In its most basic form, projection device 10 may include a light source (or lamp) 12 and an optical engine (or light engine) 14. Light source 12 may be adapted to produce a beam of light and project the light towards optical engine 14, which may be configured to generate an image. In some embodiments, light source 12 may include a lamp positioned within a reflector that is configured to direct most of the emitted light along an optical path of the system. The light source may include any suitable type of lamp. Examples include, but are not limited to, metal halide lamps and ultra-high-pressure (UHP) arc lamps, etc. The system also may include one or more filters, such as an infrared (IR) or ultraviolet (UV) filter, to filter out unwanted parts of the emission spectra of the lamp.

Light produced from light source 12 may be channeled or directed along an optical path through an interface tube or spacer 16 to optical engine 14. Optical engine 14 may include filters, lenses, mirrors, integrators, condensers, other optical elements, or combinations thereof. Attached to the optical engine may be a color wheel assembly 22. Light may pass through the interface tube 16 and through one or more portions of the color wheel assembly 22 to allow the projection of color images.

Typically, optical engine 14 includes an image-producing element 18, and other optics. Image-producing element 18 may include any suitable image-generation device, including, but not limited to, a digital micromirror (DMD), an LCD panel, or any other suitable image source. Image-producing element 18 may be configured to project light toward one or more mirrors or other optics, which, in turn, may be configured to reflect light toward a display surface. Alternatively, the image-producing element 18 may be configured to project light directly toward the display surface.

Projection device 10 also may include one or more power sources 20. In some embodiments, power source 20 may be linked to light source 12, image-producing element 18, and/or other components of projection device 10. Air may flow through one or more ventilation devices (not shown here) and may flow in the direction of the arrows depicted in FIG. 1. This flow may be directed in part by a blower assembly 13.

As depicted in FIG. 1, the components within the projection device may produce noise and vibrations when powered and during operation. Noise, as used herein, includes sound and other disturbances, including vibrations. Such noise may be transmitted through the device due to the proximity of other components and the various methods of component attachment within the device. Such noise may significantly affect the perceived quality of the device.

FIG. 2 is a plan view of a color wheel assembly 30 mounted to an optical engine 50. It should be appreciated that color wheel assembly may be mounted to the housing of optical engine 50 and thus, optical engine, as used herein includes the housing of optical engine 50.

In some embodiments, color wheel assembly 30 may include a color wheel 34, an axial pin 36, a motor 38, a bracket attachment mount 39 (shown in FIG. 3), a circuit or control board 40, and a mounting back plate 42. When integrated in a projection device, the color wheel assembly 30 may be mounted to the optical engine in such a manner that light, in the form of a light beam, may be directed from the light source (shown in FIG. 1) to, and subsequently through, the color wheel 34 in the general direction of Arrow A. While the color wheel assembly is shown here mounted to the optical engine, it should be appreciated that this assembly could be located anywhere in the projection device along an optical path between the light source and the lens.

As used herein, color wheel 34 is an optical filtering device used to allow the projection of color images. Typically, the color wheel may generate colors using a single image-producing element for all three primary colors. In some embodiments, color wheel 34 may take the form of a round, flat disk with a plurality of filters of different colors positioned along an outer perimeter.

Any suitable color wheel may be used for color wheel 34. Some color wheels, known as three-color color wheels, have filters configured to pass red, green and blue light. Others, known as four-color color wheels, have these three colors, plus a clear, uncolored portion configured to pass the entire visible spectrum. Such a configuration may allow more light to be delivered to the screen, and may thus allow the projection of a brighter image. It should be appreciated that any suitable color wheels may be utilized without departing from the scope of the invention.

Color wheel 34 may spin around an axis defined by axial pin 36 at a predetermined frequency. Rotation of color wheel 34 may cause a beam of light traveling along optical path in the direction of Arrow A to pass sequentially through each filter along the outer perimeter of the wheel. Consequently, the color of the light beam may be changed downstream of the color wheel in a sequential manner. In this manner, a series of different color images may be projected onto a viewing surface over a period of time. When performed at a sufficiently high frequency, the images may appear to the human eye as a single color image.

A motor 38 may be coupled to color wheel 34. The motor 38 for color wheel 34 may be configured to rotate color wheel 34 under the control of circuit or control board 40. It should be noted that there may be multiple circuit boards capable of directing the motor 38 to move the color wheel 34. In turn, a circuit board such as circuit board 40 may receive signals from other electronic or manual devices such as a central projection device circuit board, a computing device, a computer, user inputs, etc. Such signals may be used to control the rotation of color wheel 34. For example, circuit board 40 or other control signals may dictate the operation of motor 38 so as to dictate the frequency of color wheel rotation, and thus, create the perceived color of images displayed by the projection device.

It should be appreciated that the high frequency at which the color wheel rotates may generate noise and/or vibrations. The color wheel noise may be due to a plurality of factors, including, but not limited to, misalignment, electronic pulse waveform, bearing wear, etc. Due to the integrated position of the color wheel, the high-frequency noise and/or vibrations of the color wheel may be transmitted through the projection device via the structural members, including optical engine 50, mounting bracket 70, and any other attachment points for the color wheel.

The transmission of noise and/or movement, such as vibrations, to the optical engine may affect the quality of the image produced by the projection device. Accordingly, if image quality is low, a projection device user may perceive that the projection device is of poor quality or malfunctioning. Thus, with the use of vibration and noise control devices, such as the noise dampener described herein, a user's satisfaction with the quality and operation of the device may be improved.

Referring back to FIG. 2, optical engine 50 may be configured to permit the attaching of the color wheel assembly 30 in a functional position. Optical engine 50 may include a color wheel assembly cut-out 52 which may further include a color wheel slot 54, within which color wheel 34 may rotate along a center axis defined by axial pin 36. Further, in some embodiments, optical engine may include a configuration which enables mounting of color wheel motor 38. For example, optical engine 50 may include a color wheel motor portion slot 56 that may be sized to receive color wheel motor 38.

The optical engine 50 may further include one or more raised connection pads 60, 62, capable of interacting with a bracket 70 configured to secure color wheel assembly 30 onto optical engine 50. In some embodiments, connection pads 60, 62, may protrude from housing surface 63 to a height suitable to articulate with the bracket 70 at a functional point so as to attach and maintain color wheel assembly 30 in a functional orientation. As optical engine 50 may be a cylindrical shape, raised connection pads may be useful to hold the assembly in such a desired position. Alternatively, connection pads may be flush with, or recessed into, housing surface 63.

Optical engine 50 may include one or more connectors capable of articulating with a corresponding portion of bracket 70. These housing connectors may include one or more housing recesses 64, 66, housing tabs 68, grooves, slots, pull-thru darts, etc. In some embodiments, the recesses may be threaded and may be configured to receive a corresponding threaded fastener or fastening device. It should be appreciate that optical engine 50 further may be configured to attach to other components of the projection device, and that such connections are not shown here.

Optical engine 50, connection pads 60, 62, and bracket 70 may be composed of any material capable of assisting in supporting a color wheel assembly. Suitable materials may include, but are not limited to, metals such as aluminum, steel, magnesium, etc., plastics, composites, etc., and any combinations thereof. Furthermore, the housing, connection pads, and bracket do not all need to be composed of the same materials in a single embodiment.

Bracket 70 may be used to mount the color wheel within the projection device. Bracket 70 may provide a method to operatively secure color wheel 34 to optical engine 50. In some embodiments, bracket 70 may be configured to align and ensure precise placement of color wheel 34 within the optical path of the projection device. Referring to the embodiment shown in FIG. 2, bracket 70 may be fastened to both the color wheel assembly 30 and a first end of optical engine 50. It should be appreciated that in other embodiments, the bracket may be integrated within the optical engine, or integrated within the color wheel assembly, without departing from the scope of the disclosure. For example, the bracket may be a fixed part of the optical engine or color wheel assembly.

Bracket 70 may include a body 71 (shown in FIG. 3), and one or more retention grooves 72, 74 (shown in both FIGS. 2 and 3) configured to hold circuit board 40 in close vicinity with color wheel motor 38. Such a bracket may further include numerous apertures including bracket body apertures 84, 86 which may be configured to receive fasteners 90, 92. Such fasteners may be used to connect color wheel assembly 30 to bracket 70. Such apertures may be threaded and thus capable of receiving threaded fasteners, such as screws, threaded darts, etc., or they may be unthreaded. Exemplary fasteners, include, but are not limited to threaded or unthreaded screws, pull-thru darts, e-ring connectors, pins, clamps, rings, latches, etc.

Figure 3:
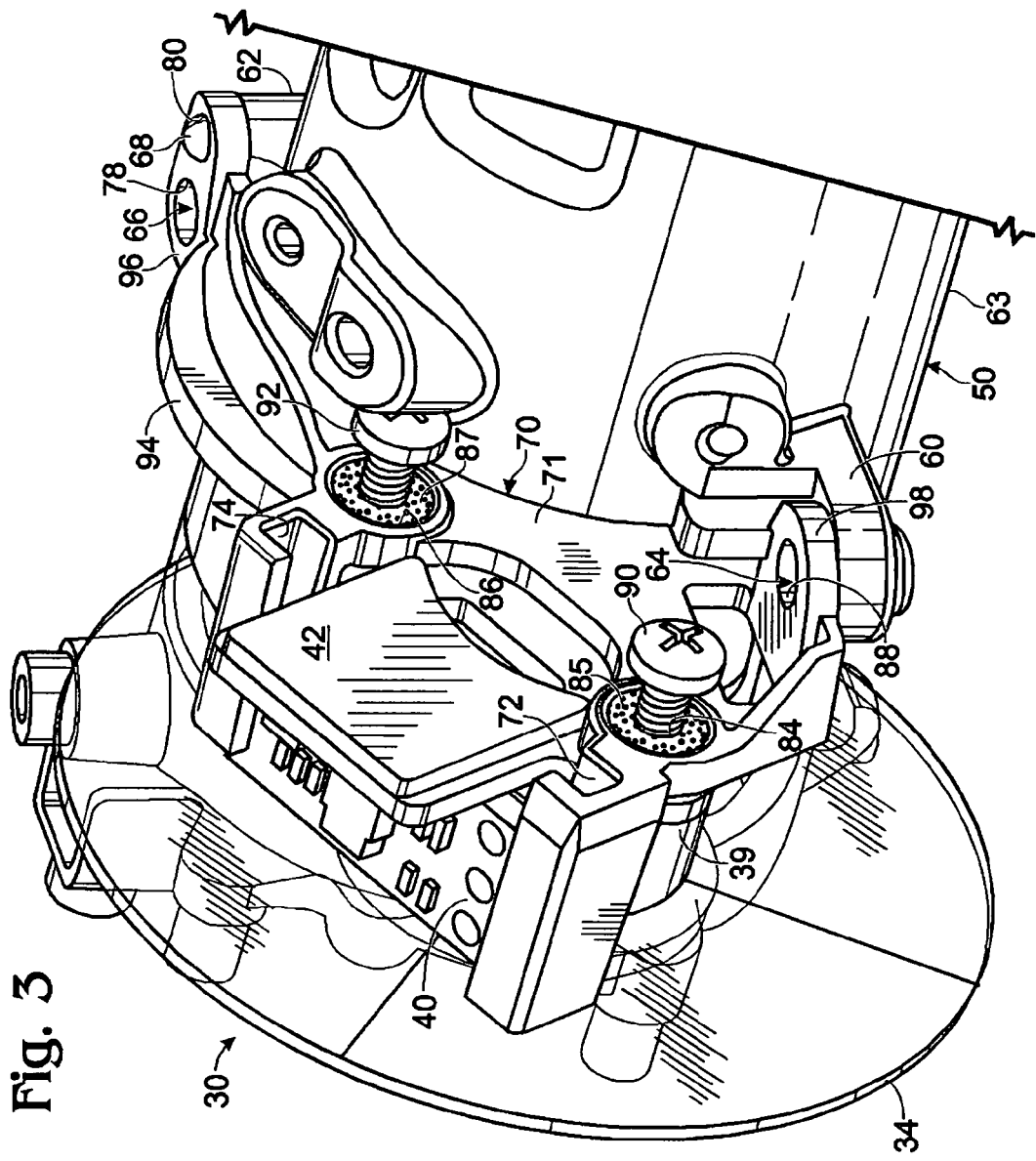
FIG. 3 is an enlarged perspective view of the assembly of FIG. 2 with attachment screws partially removed.

Bracket 70 may attach to color wheel assembly through bracket attachment mounts 39 (only one which is indicated in FIG. 3). Any suitable number of bracket attachment mounts may be provided. Such mounts may include receivers or sockets for fasteners 90, 92. By securing such fasteners through bracket 70 to bracket attachment mounts 39 of color wheel assembly 30, the color wheel assembly may be securely coupled with the bracket and optical engine 50.

As shown, bracket 70 may be configured such that the bracket is capable of simultaneously being connected to both color wheel assembly 30 and optical engine 50, and to consequently secure the assembly to both projection device components. To connect with the optical engine 50, bracket 70 may include a bracket arm 94, which may extend across the optical engine surface 63 for some distance so as to stabilize such a color assembly mounting. Although the extension is shown extending around a first portion, it should be appreciated that the arm may be further extended or cut-off. Moreover, in some embodiments, a second arm may be used and may extend in the opposite direction around the optical engine from the first bracket arm.

Bracket arm 94 may include bracket arm apertures 78, 80 located on a distal end 96 of bracket arm 94. Such apertures may assist in mounting the color wheel assembly by receiving a fastener placed into an aperture 78, 80 and subsequently into the optical engine 50, or by receiving a connection tab 68 protruding away from housing surface 63.

Additionally, bracket 70 may include a bracket tail 98 (as shown in FIG. 3) to assist in stabilizing mounting onto the optical engine 50. Bracket tail 98 may include a bracket tail aperture 88, configured to articulate with a corresponding housing recess 64. Bracket tail aperture 88 and bracket arm apertures 78, 80 may be disposed in substantially the same orientation, such that fasteners which are extended through the apertures couple with optical engine 50. It should be appreciated that any suitable fastening mechanism may be used to couple bracket tail to optical engine and such mechanism and configuration, regardless of orientation, is within the scope of the disclosure.

As discussed in more detail below, bracket 70 may include an integrated noise reduction mechanism. For example, bracket 70 may integrated one or more elastomeric grommets. In some embodiments, the elastomeric grommet may be a continuous piece extending through a portion of the bracket. For example, a single piece may provide noise reductions at multiple points along the bracket. In some embodiments, multiple elastomeric grommets may be integrated into various portions of the bracket. The integrated elastomeric grommets may be configured to substantially reduce noise from the color wheel assembly to the optical engine. It should be appreciated that the bracket including the integrated elastomeric grommets is considered a noise dampener. Other devices may also be used as noise reduction mechanisms, including, but not limited to, ridges and other surface configurations configured to absorb noise, material changes, etc.

FIG. 3 is an enlarged perspective partially exploded view of bracket 70 securing color wheel assembly 30 to optical engine 50. In this view, it can be appreciated that one or more bracket apertures 84, 86 may include aperture grommets 85, 87. Such grommets may extend substantially around the perimeter of a bracket aperture, and thus may occupy a space between bracket 71 and the inserted fasteners 90, 92 when said fasteners are placed within these apertures. Although shown as extending around apertures 84, 86, it should be appreciated that such grommets may be used on any one of the connections between bracket 70 and color wheel assembly 30 and/or optical engine 50.

Aperture grommets may be made of any suitable noise absorbing material, including, but not limited to elastomeric material. For example, aperture grommets may be composed of materials, including but not limited to, polycarbonate, silicone, flexible polymers, latex, rubbers, plastics, composites, etc. These elastomeric materials may be capable of being deformed in response to a deforming force, yet may be configured to resume an original shape after the deforming force is removed.

Noise and/or movement in the forms of high frequency vibrations, mechanical movements, etc. may be considered as a deforming force capable of deforming the elastomeric material. When the elastomeric material is deformed, it may absorb the noise, such as vibrations or sound waves, and thus, dampen the noise. Once dampened, the noise may be substantially reduced or not transmitted to another attachment point. By reducing the noise, a user may perceive the device to be of better quality. Moreover, by dampening the noise, various components and parts of the device may remain more securely fastened within the device and less prone to wear over time.

It should be appreciated that bracket 70 may provide both structural support and dampening effects. To generate such a combination function, bracket 70 may be composed of at least two different types of materials, a first support material for a substantial portion of body 71 and a second dampening material, such as the deformable elastomeric material described above. Support material for body 71 may be any suitable material configured to provide support for the attachment of color wheel assembly 30.

For example, in the depicted embodiment, aperture grommets 85, 87 may be composed of such elastomeric material such that may reduce the transmission of noise created from the high frequency rotation of the color wheel 34, and/or the color wheel motor 38 (shown in FIG. 1) to the bracket 70 or optical engine 50. By using aperture grommets 85, 87 noise and/or movement originating from the color wheel assembly may be substantially reduced as it is transmitted from the bracket attachment mount 39, through fasteners 90, 92 situated in bracket apertures 84, 85, to bracket 70 and to any structure attached to bracket 70, including the optical engine 50. In some embodiments, similar aperture grommets may be used to reduce noise transmitted to optical engine 50 from the color assembly 30, and components thereof, through bracket arm 94. Moreover, additional grommets 85, 57 may be used as well as insulation material to dampen and absorb a substantial portion of the noise from color wheel assembly 30 prior to the transmission of the noise through the attachment points of the bracket.

Figure 5:
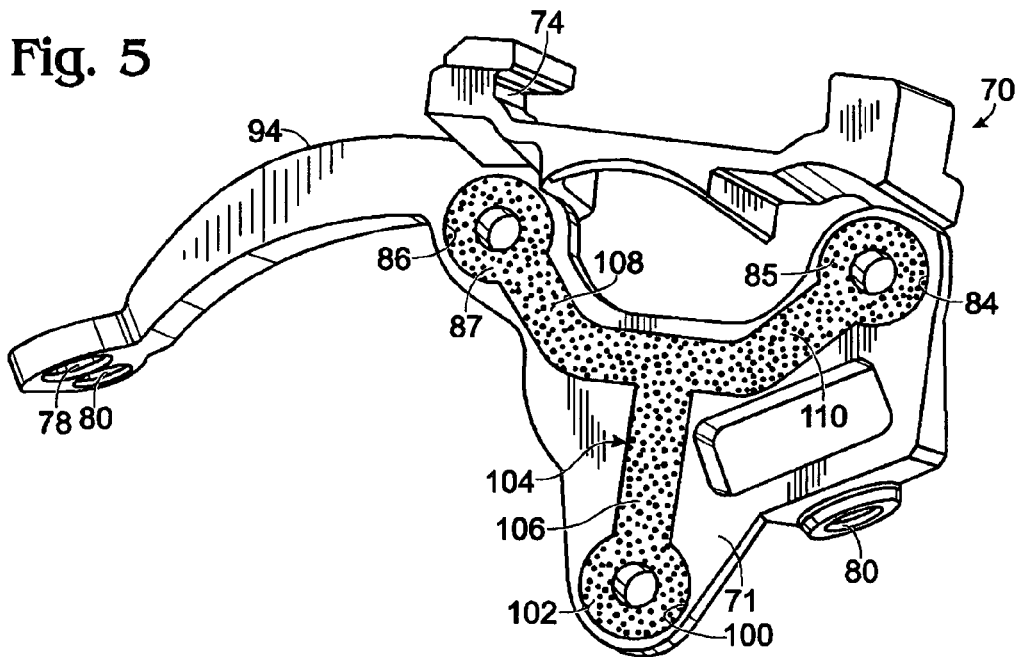
FIG. 5 is a perspective view of the reverse side of the bracket of FIG. 4 according to an embodiment of the present disclosure.

As shown in FIGS. 4 and 5, the elastomeric grommets may be integrated within the bracket. Thus, in some embodiments, integrated elastomeric grommets may be molded to the bracket at multiple attachment points of the bracket 70 for the color wheel assembly 30 and the optical engine 50.

Specifically, FIG. 4 provides a perspective view of the bracket 70 of FIG. 2 isolated from the color wheel assembly and the optical engine. As shown in this figure, bracket 70 may have numerous apertures suitable for receiving elastomeric grommets including bracket apertures 84, 86, 100 included on bracket body 71. Additionally, grommets may be provided on such attachment points, including, but not limited to bracket tail apertures and bracket arm apertures. In the illustrated embodiment, the three bracket body apertures may lie in one plane and the bracket tail aperture and bracket arm apertures may lie in a second plane.

Despite occupying these different planes, all of these bracket apertures may serve as connection points between the color wheel assembly and optical engine housing. Each of these apertures are possible transmission points for potentially image distorting noise, e.g. vibrations or sound. By implementation of the integrated grommets described in this disclosure, the noise transmition may be dampened. While the embodiment of FIGS. 4 and 5 include three aperture grommets 85, 87, 102, alternative embodiments may include additional or less grommets in bracket body or contain grommets in other portions of the bracket, such as the tail or arm. Additionally, FIGS. 3 and 4 show that the grommets are flush with the edge of body apertures, but alternative embodiment may include grommets that protrude away from the edge or are recessed in relation to aperture edge.

Referring now to FIG. 5, the reverse side of bracket 70 of FIG. 3 is shown. The bracket side of FIG. 5 may be configured to directly contact the bracket attachment mount 39 seen in FIG. 3. As seen from this side bracket 70 may incorporate an integrated configuration of elastomeric grommets such that grommets 85, 87 and 102, residing in body apertures 84, 86 and 100, may be connected by an elastomeric T-shape 104 including a base 106, a left arm 108 and a right arm 110. This elastomeric T-shape may be constructed from the same elastomeric materials from which the grommets are formed. The T-shape may also serve to dampen noise emanating from the color wheel assembly and thus aid in reducing the noise transmitted to the optical engine. It should be appreciated that other configurations are possible, without departing from the scope of the disclosure. Moreover, such a configuration or another suitable configuration may be used to link the elastomeric grommets on the optical engine mounting side of the bracket.

Figure 6:
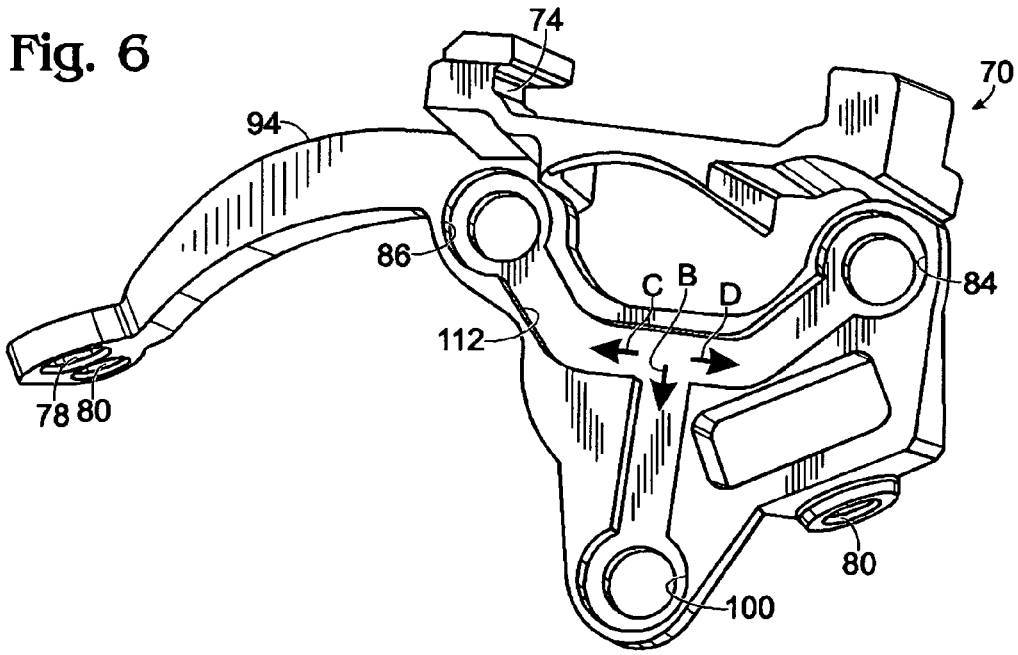
FIG. 6 is a perspective view of the bracket of FIG. 4 showing a channel configured to receive an elastomeric material.

FIG. 6 shows an exemplary bracket 70 without the integrated or molded-in, elastomeric grommet configuration. As seen here bracket 70 has a recessed T-shape channel 112 which may serve as a mold in creating the integrated elastomeric T-shape and attached elastomeric aperture grommets 85, 87, 102. The elastomeric material may be molded into the channel. As discussed above, any suitable channel shape may be used. Moreover, multiple channels, linked or non linked, may be provided within the bracket. Alternatively and/or additionally, in some embodiments, an elastomeric material may be compressed into such a channel. In even other embodiments, the elastomeric material may be secured using an adhesive or other material to one or more select portions of the bracket.

For example, in the depicted embodiment, bracket 70 may be formed first from a suitable support material, including, but not limited to, a metal or hard plastic as discussed above. A channel may be formed within the support material. After the bracket is formed, elastomer may be disposed in the center of a channel, such as the recessed T-shape channel 112 shown in FIG. 6. The elastomer may flow along the channel into the ends and forced to fill recessed T-shape channel 112 along the directions of Arrows B, C, and D. The elastomeric material may substantially fill the perimeter of apertures 84, 86 and 100. It should be appreciated that a flowable or compressible elastomer may be used to initially form the elastomeric T-shaped grommet configuration.

It should be noted that the integrated elastomeric grommets may be manufactured and assembled within the projection device with relative ease. In contrast to the use of washers or similar material which require precise positioning, the bracket with integrated grommets may enable easy manufacture while ensuring accurate positioning. Moreover, with the use of washers, positional accuracy of the color wheel may be compromised due to the necessity of providing clearance between the attaching surfaces and the loose washers during assembly. The bracket with integrated grommets may substantially reduce any loss of positional accuracy.

Additionally, unlike independent washers that may slip and move within the assembly thus affecting the position of the color wheel assembly over time, the bracket with integrated grommets may maintain a substantially stable configuration over its lifetime. This substantially stable configuration may prevent the color wheel assembly slipping over time. Additionally, materials may be selected for the integrated grommets that previously were unavailable as washers. For example, in previous configurations, washers may have been selected to enable ease of assembly, however in some situations such selected washers were too soft and less effective for securing the color assembly to the bracket. By using the integrated grommets, suitable material may be selected regardless of ease of assembly of individual washers.

Unlike the loose, independent washers, no additional clearance is needed during assembly for the bracket with integrated grommets. Moreover, as described above, the integrated grommets may be significantly more stable and result in less potential misalignment of the color wheel assembly. Further, a single step of positioning the bracket, including the integrated grommets, operates to align the color wheel assembly and provide a dampening device for the color wheel assembly and projection device.

Although described in the depicted embodiments, as a bracket that may be attached to the color wheel assembly and an optical engine, it should be appreciated that the bracket with integrated grommets may be incorporated or integrated into one of the color wheel assembly or the optical engine. Moreover, such a bracket with integrated grommets may be incorporated within any component that attaches to a second component where noise reduction is useful or desired.

Although the present exemplary embodiments illustrate the use of a bracket with integrated grommets in a projection device, it should be appreciated that such a bracket may be used in any suitable device where components generate noise and/or vibrations which reduction of such would be favorable to a user of the device. Specifically, it should be understood that such a bracket with integrated grommets may be used with devices including one or more motors which are configured to be attached to sensitive components, e.g. optical components. For example, the bracket with integrated grommets may be used in electronic devices, such as televisions, display monitors, radios, speakers, etc.

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring, nor excluding, two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A device for dampening noise in a projection device, the device comprising:
   a bracket configured to secure a color wheel assembly to an optical engine; and
   an integrated noise reduction mechanism integrated into the bracket, wherein the bracket includes a groove to receive a control board for the color wheel assembly.

2. The device of claim 1, wherein the integrated noise reduction mechanism is an elastomeric grommet.

3. The device of claim 2, wherein the elastomeric grommet is a single piece.

4. The device of claim 1, wherein the integrated noise reduction mechanism includes a plurality of elastomeric grommet integrated along the perimeter of apertures in the bracket.

5. The device of claim 1, wherein the integrated noise reduction mechanism is molded into the bracket.

6. The device of claim 1, wherein the integrated noise reduction mechanism is compressed into the bracket.

7. The device of claim 1, wherein the bracket includes a channel configured to receive the integrated noise reduction mechanism.

8. The device of claim 1, wherein the bracket includes a bracket arm configured to be attached to an optical engine.

9. The device of claim 1, wherein the bracket includes a bracket tail configured to be attached to an optical engine.

10. A noise dampening device for use to attach a first component including a moveable portion to a second component, the noise dampening device comprising:
    a bracket including a first set of apertures for attachment to the first component and a second set of apertures for attachment to the second component, wherein the bracket includes a channel configured to receive the grommet, and wherein the channel is configured in a T-shape; and
    an integrated grommet substantially surrounding at least one of the first set of apertures and the second set of apertures.

11. The noise dampening device of claim 10, wherein the first component is an optical engine.

12. The noise dampening device of claim 10, wherein the second component is a color wheel assembly.

13. The noise dampening device of claim 10, wherein the integrated grommet is an elastomeric grommet.

14. The noise dampening device of claim 10, wherein the grommet is compressed into the bracket.

15. The noise dampening device of claim 10, wherein the grommet is molded into the bracket.

16. A projection device comprising the noise dampening device of claim 10.

17. A projection device comprising:
    a light source;
    an optical engine receiving light produced from the light source and configured to generate an image, said optical engine housed in a optical engine housing;
    a color wheel assembly attached to the optical engine through which light is projected; and
    a bracket coupled to the color wheel assembly and the optical engine including a noise reduction mechanism configured to dampen noise transmitted from the color wheel assembly to the optical engine, wherein the noise reduction mechanism includes an elastomeric grommet molded into a T-shaped channel in the bracket.

18. The projection device of claim 17, wherein the bracket is composed of a support material.

19. The projection device of claim 17, wherein the noise reduction mechanism includes an elastomeric grommet.

20. The projection device of claim 17, wherein the elastomeric grommet is integrated within the bracket.

21. A projection device comprising:
    a mounting means for a color wheel assembly, the mounting means including a groove to receive a control board for the color wheel assembly; and
    a noise dampening means to reduce noise generated by the color wheel assembly;
    wherein the noise dampening means is integrated into the mounting means.

22. The projection device of claim 21, wherein the mounting means includes a bracket configured to operably couple the color wheel assembly to an optical image.

23. The projection device of claim 21, wherein the noise dampening means includes an elastomeric portion.

24. The projection device of claim 21, wherein the noise dampening means is composed of at least a first support material and a second elastomeric material.

* * * * *